Sept. 23, 1958 J. L. RENNICK 2,853,545

COLOR TELEVISION RECEIVER SYNCHRONIZING SYSTEM

Filed Aug. 9, 1952 2 Sheets-Sheet 1

INVENTOR:
JOHN L. RENNICK
BY Francis W. Crotty
HIS ATTORNEY

Sept. 23, 1958 J. L. RENNICK 2,853,545

COLOR TELEVISION RECEIVER SYNCHRONIZING SYSTEM

Filed Aug. 9, 1952 2 Sheets-Sheet 2

INVENTOR:
JOHN L. RENNICK
BY Francis W. Crotty
HIS ATTORNEY.

United States Patent Office
2,853,545
Patented Sept. 23, 1958

2,853,545

COLOR TELEVISION RECEIVER SYNCHRONIZING SYSTEM

John L. Rennick, Elmwood Park, Ill., assignor to Zenith Radio Corporation, a corporation of Delaware Application August 9, 1952, Serial No. 303,537
8 Claims. (Cl. 178—5.4)

Figure 1:
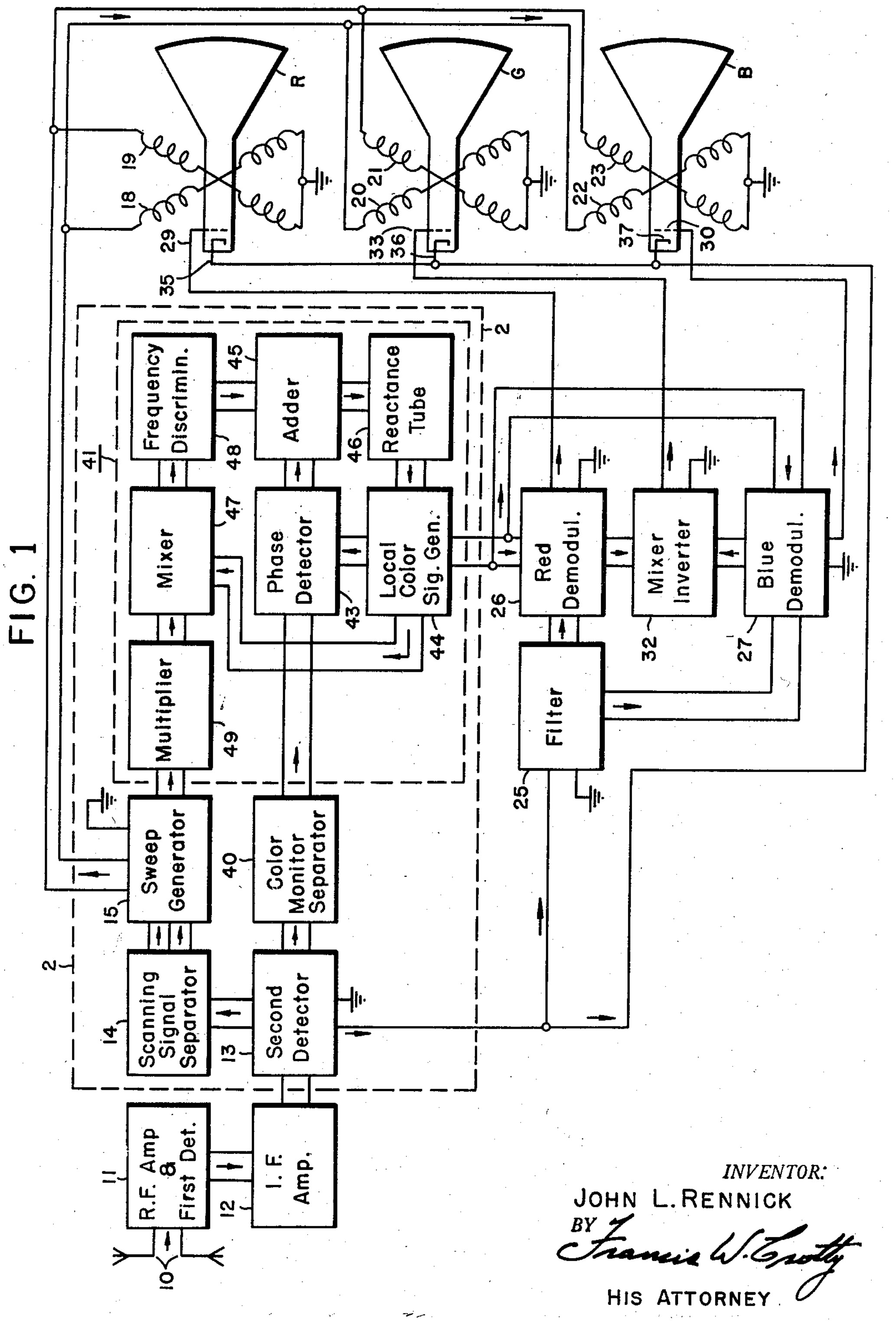

This invention relates to a new and improved color television receiver and is more particularly concerned with apparatus for controlling the phase and frequency relationship of a color-demodulating signal developed within the receiver. The method is especially applicable to the reproduction of a received telecast of a type basically similar to that presently proposed by the National Television System Committee, and is described in that connection.

In order to achieve intelligible reproduction of a telecast in accordance with the color television system sponsored by the National Television System Committee, commonly referred to as the NTSC system, a continuous oscillation signal of stable phase and corresponding to the color subcarrier frequency must be provided at the receiver. To that end, a synchronizing signal containing information related to both the phase and the frequency of the color subcarrier is included in the transmitted signal. This color-synchronizing information is employed at the receiver to control a locally generated color-demodulating signal and to lock it to a proper reference.

The NTSC proposal presently calls for a "burst" of energy at the color subcarrier frequency to be transmitted during the horizontal blanking interval. The color burst is transmitted immediately following a horizontal scansion-synchronizing pulse of the type currently employed in monochrome transmission, and the scansion-synchronizing pulse and the color burst are of approximately equal peak amplitude. This system is subject to several disadvantages, both as respects compatibility with monochrome receivers and in the separation of scansion and color-synchronizing information in color receivers. For example, many monochrome receiver models currently in production, as well as many more which have been in use for some time, are unable to distinguish between the horizontal scansion-synchronizing pulse and the color-synchronizing burst of the NTSC system. This causes the horizontal scanning systems of such sets to react unpredictably to the NTSC signal, and results in unintelligible reproduction of the image information contained in that signal. On the other hand, in order to provide the scanning system of a color television receiver with the necessary means to discriminate between these two sets of synchronizing data, it is often necessary to add a considerable amount of equipment to the scanning system. The first of these objections is by far the more important, since the entire NTSC proposal is predicated upon a desire to formulate a color television system which is substantially completely compatible with the current monochrome transmission system and the equipment which has been manufactured for use therewith.

In order to avoid the above-noted objections, it has been suggested that a color subcarrier monitoring signal be transmitted during the vertical blanking interval rather than during the horizontal blanking interval. Because the vertical blanking interval is of considerably greater duration than the horizontal blanking interval, and, in addition, is not as rigidly restricted with respect to duration, it is believed that the addition of the color monitoring signal during the vertical blanking interval will not adversely affect the operation of monochrome receivers. According to this proposal, the color monitor signal may be sufficiently delayed with respect to the vertical synchronizing components to preclude disturbing the operation of the scanning deflection system. This solution, however, presents some problems of its own. For instance, the vertical blanking frequency of 60 cycles per second permits the frequency of the local color demodulation signal generator to drift considerably between periods of controlled synchronization. Furthermore, the relatively short duration of the vertical blanking interval with respect to the field trace interval makes it extremely difficult to prevent the receiver from operating on a side-lock frequency, that is to say, from operating under a condition in which the local color-modulating signal is locked at a frequency which differs from the desired standard by an integral multiple of 60 cycles.

The fact that the color subcarrier frequency is an odd integral multiple of one-half the line-scanning frequency of 15,750 cycles per second makes it possible to use the line-scanning frequency information contained in the recurrent horizontal synchronizing pulses to regulate the frequency of the locally generated color-demodulating signal. However, the information thus derived is completely ambiguous as to phase, since no constant phase relationship is maintained at the transmitter, and, even if it were, it would be extremely difficult to maintain a fixed phase relationship throughout the frequency multiplication stages required in a receiver designed to operate in this manner. However, the disadvantages and difficulties inherent in a color-synchronizing system utilizing a color subcarrier burst transmitted during the vertical blanking intervals and those inherent in the last-described system employing the horizontal scanning pulse frequency are complementary; in other words, the weaknesses of the one system are reflected in the desirable features of the other, and vice-versa.

It is an object of this invention, therefore, to provide a new and improved color television receiver for responding to frequency and phase information derived from two diverse sources.

It is an additional object of this invention to provide a color television receiver which regulates the basic frequency of a locally generated color-demodulating signal in response to line-scanning frequency information.

It is a further object of this invention to provide a color television receiver which contains relatively simple and economical apparatus.

It is a corollary object of this invention to provide a color television receiver in which the phase and frequency of a locally generated color-demodulating signal are respectively regulated in accordance with information derived from a color monitor signal and scanning signal components.

In accordance with the invention, a color television receiver for reproducing a received telecast including synchronizing components recurring at a given scanning frequency and further including a pulse-modulated color monitor signal having a frequency corresponding to a predetermined integral multiple of one-half that scanning frequency comprises means for generating a local signal having a nominal frequency equal to that of the received monitor signal. Means are provided for employing the synchronizing components independently of the monitor signal to maintain the frequency of the local signal equal to that of the received monitor signal. Means are further provided for utilizing the received monitor signal to maintain a predetermined phase relation between the received monitor signal and the local signal.

Figure 2:
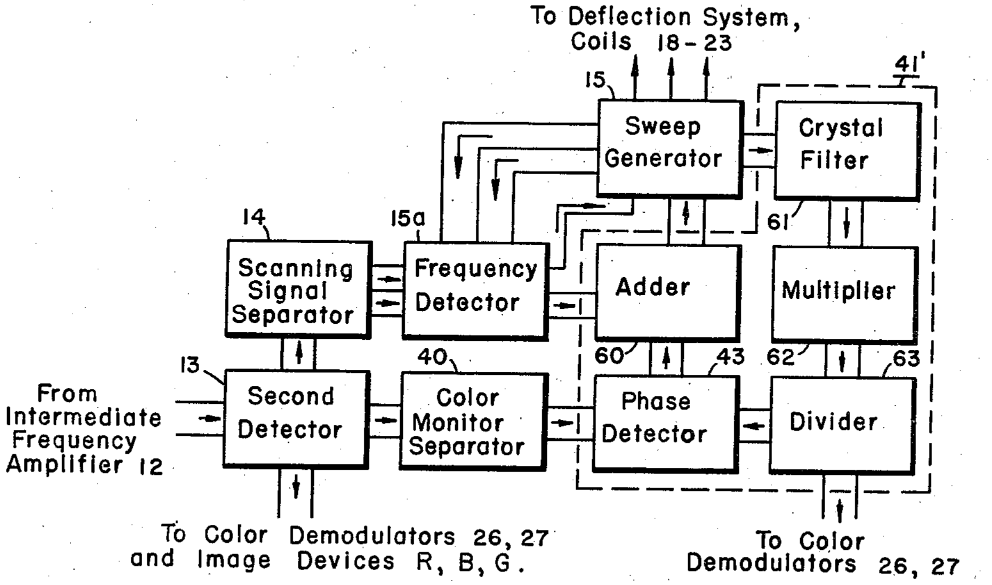

The features of the invention which are believed to be novel are set forth with particularity in the appended claims. The organization and manner of operation of the invention itself, together with further objects and advantages thereof, may best be understood by reference to the following description taken in conjunction with the accompanying drawings, in which:

Figure 1 is a schematic representation of a color television receiver incorporating the invention; and Figure 2 is a schematic representation of another type of apparatus for performing the inventive method.

The color television receiver of Figure 1 includes an antenna 10, a radio-frequency amplifier and first detector 11, and an intermediate-frequency amplifier 12 coupled to a second detector 13. Second detector 13 includes three sets of output terminals, one of which is coupled to a scansion-synchronizing signal separator 14 which, in turn, is coupled to a sweep generator 15; the output circuit of sweep generator 15 is connected in parallel to three sets of scanning deflection coils 18—19, 20—21, and 22—23 which are operatively associated with three image-reproducing devices R, G, and B. Each of the devices R, G, and B comprises a cathode-ray tube having a screen coated with a luminescent phosphor which, when excited, glows in one of the primary colors; these colors are normally taken as red, green and blue respectively.

A second set of output terminals of second detector 13 is coupled to a filter 25 which in turn is coupled to a red demodulator 26 and a blue demodulator 27. The output circuit of red demodulator 26 is coupled to the control grid 29 of cathode-ray tube R, whereas the output circuit of blue demodulator 27 is in circuit with the control grid 30 of cathode-ray tube B. Demodulators 26 and 27 are also coupled to a mixer-inverter 32 having an output circuit coupled to the control grid 33 of cathode-ray tube G. The output circuit of second detector 13 is also coupled to the cathodes 35, 36 and 37 of cathode-ray tubes R, G, and B, respectively.

Second detector 13 is further coupled to a color monitor signal separator 40, which is in circuit with a color control system 41. Color control system 41 is also coupled to sweep generator 15 and to color demodulators 26 and 27.

The structural components of the television receiver of Figure 1, except for control system 41, are well known in the art, and a detailed description of their operation is therefore deemed unnecessary. In brief, a transmitted color television signal is received at antenna 10, amplified and detected in radio-frequency amplifier and detector 11, again amplified in intermediate-frequency amplifier 12, and applied to second detector 13. The intermediate-frequency signal received at detector 13 is demodulated to produce a composite signal containing video information (including both monochrome and color data), scanning signal information, and a color monitor signal. This composite signal is applied to separator 14, wherein the periodically recurring scansion-synchronizing components are separated from the detected signal and individually applied to sweep generator 15. In generator 15, the synchronizing components are employed to control a horizontal sweep-signal generator, the output of which is connected to horizontal deflection coils 18, 20 and 22. The vertical synchronizing signals control other circuits in generator 15 which develop vertical deflection signals, and these signals are applied to vertical deflection coils 19, 21 and 23.

The composite video signal developed in second detector 13 is also applied to cathodes 35, 36, and 37 of cathode-ray tubes R, G, and B. At the same time, the output of detector 13 passes through band-pass filter 25, wherein most of the monochrome information is removed, and is then applied to color demodulators 26 and 27. The red demodulator 26 detects the color information requisite for operation of cathode-ray tube R in reproducing the red portion of the transmitted image and applies that information to grid 29. In the same manner, blue demodulator 27 applies a blue color-control signal to grid 30. The outputs of demodulators 26 and 27 are combined in mixer-inverter 32 to develop a green color-control signal which is applied to grid 33 to control the operation of cathode-ray tube G; color demodulating systems of this type are shown and described in co-pending applications Serial No. 232,559 filed June 20, 1951 and Serial 215,761 filed March 15, 1951, both in the name of John L. Rennick and assigned to the same assignee as the present application. The red, green and blue images produced by tubes R, G, and B, respectively, are combined by an optical system (not shown) to produce a single color image corresponding to the telecast received at antenna 10. Although a three-tube system is shown and described, the invention is equally applicable to systems employing a single-tube three-gun or a single-tube single-gun tricolor reproducing tube.

In accordance with the invention, color-demodulating system 41 is included in the receiver of Figure 1 to provide a means for controlling the color content of the reproduced image. System 41 includes a phase detector 43 coupled to color monitor separator 40 and to a local color-signal generator 44; the output circuit of detector 43 is coupled to an adder circuit 45. Adder 45 is connected to a reactance tube 46 which is in turn coupled to generator 44. One set of output terminals of generator 44 is coupled to a mixer 47 which is also coupled through a frequency multiplier 49 to sweep generator 15, while the output of mixer 47 is coupled to a frequency discriminator 48 which is in circuit with adder 45. Another set of output terminals of generator 44 is coupled to demodulators 26 and 27 in parallel.

In order to understand the operation of color demodulating control system 41 and the steps of the inventive method which it performs, a brief description of the signal received at antenna 10 is desirable. The signal generally resembles a standard monochrome television signal in that it includes separate and distinct intervals during which three types of information are transmitted; these intervals include the video or picture portions of the transmission, the horizontal blanking intervals, and the vertical blanking intervals. The horizontal blanking intervals, which recur at a rate of 15,750 cycles per second under presently adopted standards, include horizontal blanking pulses of the same type as those employed in monochrome transmission, while the vertical blanking intervals, which have a repetition frequency of 60 cycles per second according to present standards, include vertical blanking pulses which are also generally equivalent to those utilized in black and white television. The vertical blanking intervals further include pulses of a color monitor signal having a predetermined phase relationship to the color subcarrier signal employed at the transmitter as well as a frequency equal to that of the color subcarrier. The color subcarrier frequency is chosen as an integral multiple of one-half the line scanning frequency of 15,750 cycles per second; the present proposed standard is 3.898125 megacycles per second.

When the receiver is placed in operation, signal generator 44 is energized and develops a local color signal having a nominal frequency equal to that of the received monitor signal. At the same time, the horizontal scanning signal developed by sweep generator 15 is applied to multiplier 49, wherein its frequency is multiplied to derive a comparison signal having a frequency which varies from that developed in generator 44 by one-half the line scanning frequency. In accordance with the proposed standards, the signal developed by generator 44 has a nominal frequency of 3.898125 megacycles, which is equal to the 495th harmonic of one-half the line scanning frequency. This being the case, the comparison signal produced by multiplier 49 has a frequency equal to either the 247th or 248th harmonic of the line-scanning frequency, or, in other words, equal to the 494th or 496th harmonic of one-half the line-scanning frequency. These two signals are both applied to mixer 47 and are heterodyned therein to produce a beat signal having a nominal frequency of 7.875 kilocycles. The beat signal is applied to frequency discriminator 48 which develops a control potential representative of the relationship of the beat signal to its established standard frequency. The control potential developed in the discriminator is applied to reactance tube 46, through adder 45, and is thus utilized to control the frequency of the output of color-signal generator 44.

At the same time, the pulse-modulated color monitor signal included in the received telecast is separated from the output of second detector 13 by color-burst separator 40 and is then applied to phase detector 43. The local signal generated in generator 44 is likewise applied to the phase detector, and a control potential is developed therein which is indicative of any phase difference between the received color monitor signal and the local signal. This control potential is applied to adder 45, wherein it is combined with the control potential developed by the discriminator 48 and the resultant combined control potential is employed to control the phase and frequency of the local signal developed in generator 44. Thus, the automatic frequency control potential developed by discriminator 48 prevents signal generator 44 from falling into a "sidelock" at some frequency varying from the desired standard by 60 cycles per second or some small multiple thereof, while the automatic phase control potential maintains a predetermined phase relationship between the signal generator and the received color monitor signal. As a result, the output of signal generator 44 is precisely controlled both as to phase and frequency and therefore provides the necessary accurate information to enable demodulators 26 and 27 correctly to interpret the color information contained in the received telecast.

Figure 2 shows an alternative apparatus, replacing those elements of Figure 1 enclosed in dash outline 2—2, in which color demodulating control system 41' is substituted for system 41. In this figure a frequency detector 15*a*, which is normally considered a part of sweep generator 15, is shown as a separate element interposed in circuit between scansion-synchronizing signal separator 14 and sweep generator 15. An adder 60 is coupled to frequency detector 15*a* and to sweep generator 15. One of the output circuits of the sweep generator is coupled to a crystal filter 61 which is in turn coupled to a frequency multiplier 62. A frequency divider 63 is interposed in circuit between multiplier 62 and a phase detector 43 and also has output connections leading to color demodulators 26 and 27. As in Figure 1, color monitor separator 40 is included in circuit between second detector 13 and a phase detector 43, while the output of phase detector 43 is coupled to adder 60.

When the receiver of Figure 1, as modified to include the apparatus of Figure 2, is placed in operation, the horizontal deflection signal developed by generator 15 is applied to crystal filter 61; the crystal filter selects a predetermined high harmonic of the horizontal scanning frequency and applies it to multiplier 62. Assuming that the scanning and color subcarrier frequencies are the same as those noted in connection with the description of Figure 1, frequency multiplier 62 multiplies the frequency of the signal received from filter 61 to obtain a signal equal to the 495th harmonic of the line-scanning frequency. This signal is then applied to divider 63, which develops an output signal having a frequency of one-half of the 495th harmonic of the scanning frequency, or, in other terms, having a frequency equal to the 495th multiple of one-half the line-scanning frequency.

The signal developed by divider 63 is supplied to color demodulators 26 and 27 and is also applied to phase detector 43. In the phase detector, the local signal is compared with the received color monitor signal derived from the output of second detector 13 by color separator 40. The phase detector develops a control potential responsive to the phase relationship between the local signal and the received monitor signal and applies this control potential to adder 60. At the same time, frequency detector 15*a* develops an automatic control potential which is representative of the variations in frequency between the scansion-synchronizing signal derived in scanning signal separator 14 and the horizontal deflection signal developed in sweep generator 15. This frequency-control potential is applied to adder 60, wherein it is combined with the phase-control potential supplied by phase detector 43. The combined control voltage from adder 60 is then employed to control the frequency and phase of the line-scanning signal developed in sweep generator 15. Because the phase and frequency of the output of divider 63 are directly related to the output of the sweep generator, the control established is equally effective with respect to the color-demodulating signal supplied to demodulators 26 and 27. The apparatus included in color-demodulating system 41', including adder 60, filter 61, multiplier 62, divider 63, color separator 40, and phase detector 43, thus performs the same basic functions as system 41 of Figure 1 and effectively carries out the method of the invention.

While particular embodiments of apparatus have been shown and described, it is apparent that changes and modifications may be made without departing from the invention in its broader aspects, and, therefore, the aim in the appended claims is to cover all such changes and modifications as fall within the true spirit and scope of the invention.

I claim:

1. A color television receiver for reproducing a received telecast including synchronizing components recurring at a given scanning frequency and further including a pulse-modulated color monitor signal having a frequency corresponding to a predetermined integral multiple of one-half said scanning frequency, said receiver comprising: means for generating a local signal having a nominal frequency equal to that of said received monitor signal; means for employing said synchronizing components independently of said monitor signal to maintain the frequency of said local signal equal to that of said received monitor signal; and means for utilizing said received monitor signal to maintain a predetermined phase relation between said received monitor signal and said local signal.

2. A color television receiver for reproducing a received telecast including synchronizing components recurring at a given scanning frequency and further including a pulse-modulated color monitor signal having a frequency corresponding to a predetermined integral multiple of one-half said scanning frequency, said receiver comprising: means for generating a local signal having a nominal frequency equal to that of said received monitor signal; means for developing a comparison signal having a frequency controlled by said synchronizing components and corresponding to a predetermined integral multiple of one-half said scanning frequency; means for utilizing said local signal and said comparison signal to derive an automatic frequency control potential representing the variations in frequency of the compared signals from a reference frequency relation; means for employing said automatic frequency control potential to maintain said reference frequency relation; and means for utilizing said received monitor signal to maintain a predetermined phase relation between said received monitor signal and said local signal.

3. A color television receiver for reproducing a received telecast including synchronizing components recurring at a given scanning frequency and further including a pulse-modulated color monitor signal having a frequency corresponding to a predetermined integral multiple of one-half said scanning frequency, said receiver comprising: means for generating a local signal having a nominal frequency equal to that of said received monitor signal; means for employing said synchronizing components independently of said monitor signal to maintain the frequency of said local signal equal to that of said received monitor signal; means for comparing said local signal with said received color-monitor signal to derive an automatic phase control potential representative of the variations in phase of the compared signals from a predetermined phase relation; and means for utilizing said automatic phase control potential to maintain said predetermined phase relation.

4. A color television receiver for reproducing a received telecast including synchronizing components recurring at a given scanning frequency and further including a pulse-modulated color monitor signal having a frequency corresponding to a predetermined odd integral multiple of one-half said scanning frequency, said receiver comprising: means for generating a local signal having a nominal frequency equal to that of said received monitor signal; means for developing a comparison signal having a frequency corresponding to a predetermined integral multiple of said line-scanning frequency; means for heterodyning said comparison signal with said local signal to derive a beat signal having a frequency corresponding to the frequency difference between said local signal and said comparison signal; means for utilizing said beat signal to develop an automatic frequency control potential representative of the variations of said beat signal from a predetermined reference frequency; means for employing said automatic frequency control potential to maintain the frequency of said local signal equal to that of said received monitor signal; and mean for utilizing said received monitor signal to maintain a predetermined phase relation between said received monitor signal and said local signal.

5. A color television receiver for reproducing a received telecast including synchronizing components recurring at a given scanning frequency and further including a pulse modulated color monitor signal having a frequency corresponding to a predetermined integral multiple of one-half said scanning frequency, said receiver comprising: means for developing a scanning-control signal having a frequency corresponding to said scanning frequency; means for multiplying said scanning-control signal to generate a local signal having a nominal frequency equal to that of said received monitor signal; means for employing said synchronizing components to maintain the frequency of said local signal equal to that of said received monitor signal; and means for utilizing said received monitor signal to maintain a predetermined phase relation between said received monitor signal and said local signal.

6. A color television receiver for utilizing a composite television signal including scansion-synchronizing components recurring at a predetermined repetition frequency and further including a pulse-modulated color monitor signal of a nominal frequency corresponding to an integral multiple of one-half said repetition frequency, said receiver comprising: means, including a local oscillator, for generating a comparison signal having a nominal frequency harmonically related to that of said monitor signal; a frequency detector for developing a control potential indicative of variations of two different applied signals from a predetermined frequency relationship; means for applying said comparison signal and a signal of a frequency derived from and harmonically related to said scansion-synchronizing components to said frequency detector to generate a first control potential; a phase comparator for developing a control potential indicative of the phase difference between two individually applied signals; means for applying said monitor signal to said phase comparator; means coupling said local oscillator to said phase comparator to supply thereto a reference signal of a nominal frequency substantially equal to that of said monitor signal for comparison with said monitor signal to develop a second control potential; and means for utilizing said first and second control potentials to maintain a predetermined phase and frequency relationship between said comparison signal and said monitor signal.

7. A color television receiver for utilizing a composite television signal including scansion-synchronizing components recurring at a predetermined repetition frequency and further including a pulse-modulated color monitor signal of a nominal frequency corresponding to an integral multiple of one-half said repetition frequency, said receiver comprising: an oscillator for generating a local signal having a nominal frequency equal to that of said received monitor signal; means, controlled by said scansion-synchronizing components, for developing a comparison signal having a frequency corresponding to a predetermined integral multiple of said repetition frequency; a mixer, coupled to said oscillator and said comparison signal generating means, for heterodyning said local signal with said comparison signal and deriving a beat signal having a frequency corresponding to the frequency difference therebetween; a frequency discriminator coupled to said mixer for developing a frequency-control potential representative of deviations of said beat signal from a predetermined reference frequency; a phase comparator for generating a phase-control potential indicative of the phase difference between two individually applied signals; means for applying said monitor signal to said phase comparator; means coupling said oscillator to said phase comparator whereby a phase-control potential representative of phase differences between said local signal and said monitor signal is developed by said phase comparator; and means for utilizing said phase and frequency-control potentials to maintain a predetermined phase and frequency relationship between said local signal and said monitor signal.

8. A color television receiver for utilizing a composite television signal including scansion-synchronizing components recurring at a predetermined repetition frequency and further including a pulse-modulated color monitor signal of a nominal frequency corresponding to an integral multiple of one-half said repetition frequency, said receiver comprising: an oscillator, for generating a scanning-control signal having a frequency equal to said repetition frequency; a frequency detector for developing a control potential indicative of variations of two different applied signals from a predetermined frequency relationship; means for applying said scanning-control signal and said scansion-synchronizing components to said frequency detector to generate a frequency control potential; a multiplier network coupled to said oscillator for deriving a local signal having a nominal frequency equal to that of said received monitor signal; a phase comparator, coupled to said multiplier network, for generating a control potential indicative of the phase difference between two individually applied signals; means for applying said monitor signal to said phase comparator for comparison with said local signal to develop a phase-control potential; and means for utilizing said phase- and frequency-control potentials to regulate the phase and frequency of said scanning-control signal and thereby maintain a predetermined phase and frequency relationship between said monitor signal and said comparison signal.

References Cited in the file of this patent

UNITED STATES PATENTS 2,594,380 Barton et al. ____________ Apr. 29, 1952

OTHER REFERENCES

"Recent Developments in Color Synchronization in the RCA Color Television System," RCA Bulletin on Color Television, February 1950, pages 2, 3, 4 and 5.